(12) United States Patent
Yasuda (10) Patent No.: US 9,285,640 B2
(45) Date of Patent: Mar. 15, 2016

(54) LIQUID CRYSTAL DISPLAY DEVICE

(71) Applicant: Mitsubishi Electric Corporation, Tokyo (JP)

(72) Inventor: Shohei Yasuda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 118 days.

(21) Appl. No.: 14/221,208

(22) Filed: Mar. 20, 2014

(65) Prior Publication Data

US 2014/0293209 A1    Oct. 2, 2014

(30) Foreign Application Priority Data

Mar. 26, 2013 (JP) ................. 2013-063351

(51) Int. Cl.
*G02F 1/1343* (2006.01)
*G02F 1/1362* (2006.01)

(52) U.S. Cl.
CPC ........ *G02F 1/1362* (2013.01); *G02F 1/134336* (2013.01); *G02F 2001/134318* (2013.01)

(58) Field of Classification Search
CPC .................................................. G02F 1/1343
See application file for complete search history.

(56) References Cited

U.S. PATENT DOCUMENTS

| 4,973,135 A | 11/1990 | Okada et al. |
| 6,738,106 B1 | 5/2004 | Tanahara et al. |
| 2007/0216845 A1* | 9/2007 | Liao et al. ..................... 349/149 |
| 2010/0026950 A1* | 2/2010 | Furuta et al. .................. 349/139 |
| 2010/0144391 A1* | 6/2010 | Chang et al. .................. 455/566 |
| 2014/0028535 A1* | 1/2014 | Min et al. ........................ 345/87 |

FOREIGN PATENT DOCUMENTS

| JP | 61-143788 A | 7/1986 |
| JP | 2001-154222 A | 6/2001 |
| JP | 2002-091391 A | 3/2002 |

* cited by examiner

*Primary Examiner* — Timothy L Rude
(74) *Attorney, Agent, or Firm* — Studebaker & Brackett PC

(57) ABSTRACT

A liquid crystal display device according to the present invention is a liquid crystal display device in which liquid crystals are sealed between a TFT array substrate, and a counter substrate formed with a counter electrode. A plurality of scanning signal wirings and a plurality of image signal wirings are formed in a matrix on the TFT array substrate. The counter electrode is configured from a plurality of counter electrode lines. Each of the plurality of counter electrode lines is provided along a corresponding one of the plurality of scanning signal wirings or a corresponding one of the plurality of image signal wirings in plan view. Each of the plurality of counter electrode lines has a potential distribution in an extending direction. The respective potential distributions for the plurality of counter electrode lines are different.

15 Claims, 10 Drawing Sheets

LIQUID CRYSTAL DISPLAY DEVICE

BACKGROUND OF THE INVENTION

1. Field of the Invention

The present invention relates to a liquid crystal display device, and more particularly to a liquid crystal display device in which liquid crystals are sealed between a TFT array substrate and a counter substrate formed with a counter electrode.

2. Description of the Background Art

An active matrix liquid crystal display device includes a TFT (Thin Film Transistor) array substrate, a color filter substrate that faces the TFT array substrate, and liquid crystals that are sealed between these substrates. The TFT array substrate is configured such that scanning signal wiring, image signal wiring, a pixel electrode, and a switching element are arranged in a matrix in a display area. Additionally, a mounting area where an IC and the like are mounted, and a frame area where wiring is drawn from a terminal mounted in the mounting area to the respective signal wirings (the scanning signal wirings, and the image signal wirings) in the display area are present around the display area.

On the color filter substrate (counter substrate), a color filter and a counter electrode are formed. The switching element is turned on by a scanning signal, so that the pixel electrode is charged to the potential of the image signal wiring. At the time of switch off, the potential of the pixel electrode vary (decrease) depending on capacitance between scanning signal line and the pixel electrode. Generally, this potential variation of the pixel electrode is called feedthrough (voltage) or a through voltage. After feedthrough, a voltage applied between the pixel electrode and the counter electrode determines luminance in each pixel.

The active matrix liquid crystal display device that adopts a TFT as a switching element sometimes has a problem that display characteristics become nonuniform in a display surface, for example, flickers occur.

The voltage variation due to feedthrough has a distribution in the display surface, thereby causing the nonuniformity of the display characteristics of the display surface. The reason why this voltage variation becomes nonuniform in the display surface is that different scanning signal delay for each pixel electrode is caused by resistance or capacitance that the scanning signal wiring has.

The larger signal delay is, the higher a pixel electrode potential after feedthrough is. Since an AC potential is applied to image signal wiring in order to prevent burn-in, the center potential of the pixel electrode potential after the feedthrough becomes an optimum common potential (hereinafter, described as optimum Vcom). That is, the larger the signal delay is, the larger the optimum Vcom is (e.g., see Japanese Patent Application Laid-Open No. 2001-154222). When the potential of the counter electrode (i.e., the common potential) is deviated from the optimum Vcom, flickers occur.

Furthermore, a routing wiring from a mounting terminal such as an IC to a display area also causes the delay of a scanning signal. A COG (Chip on Glass) system has a structure in which an IC is directly mounted on a substrate, and a routing wiring on a panel is drawn from the mounting terminal of the IC to the display area. A COF (Chip on Film) system has a structure in which an IC is mounted on a film substrate, and a film is mounted on a panel, and a routing wiring on a panel is drawn from a mounting terminal that connects the film and the panel, to the end of a display area.

In a case where the mounting terminal is arranged on the lower side of the display area, the length of a routing wiring connected to a scanning signal wiring on the upper side of the display area is getting longer, and the length of a routing wiring connected to the scanning signal wiring on the lower side of the display area is getting shorter. Generally, the width of the frame area where routing wirings are arranged is required to be narrowed as much as possible. Therefore, it is often difficult to sufficiently decrease difference in resistance of the routing wirings on the upper side and the lower side by changing the wiring widths of the routing wirings. Accordingly, when a scanning signal is input to a scanning signal input part on the end of the display area, signal delay occurs. Therefore, the optimum Vcom has not only a potential distribution on scanning signal wirings, but also different potential distributions for the respective scanning signal wirings.

As described above, it is necessary to perform not only a countermeasure against signal delay in a direction in which the scanning signal wirings extend, but also a countermeasure against signal delay for each scanning signal wiring.

Japanese Patent Application Laid-Open No. 2002-91391 describes a technology of inclining a distribution of counter potentials by applying different potentials to the both ends of the counter electrode, and bringing the potential distribution of counter potentials close to a potential distribution of the optimum Vcom. However, as described above, the potential distributions of the optimum Vcom are different for the respective scanning signal wirings, and therefore only the uniform inclination of the potential distributions as the entire counter electrode is insufficient.

SUMMARY OF THE INVENTION

An object of the present invention is to provide a liquid crystal display device in which an influence of the delay of a scanning signal is suppressed, and a display characteristic is uniformized in a display area.

A liquid crystal display device according to the present invention is a liquid crystal display device in which liquid crystals are sealed between a TFT array substrate 10, and a counter substrate 20 formed with a counter electrode. A plurality of scanning signal wirings 11 and a plurality of image signal wirings 13 are formed in a matrix on the TFT array substrate 10. The counter electrode is configured from a plurality of counter electrode lines 22, and each of the plurality of counter electrode lines 22 is provided along a corresponding one of the plurality of scanning signal wirings 11 or a corresponding one of the plurality of image signal wirings 13 in plan view. Each of the plurality of counter electrode lines 22 has a potential distribution in an extending direction, and the respective potential distributions for the plurality of counter electrode lines 22 are different.

According to the present invention, the counter electrode lines each have the counter potential distribution in the extending direction, and the respective counter potential distributions for the counter electrode lines are different. Accordingly, even in a case where the optimum common potential (optimum Vcom) has a distribution in vertical and horizontal directions with respect to the display area, the potential distribution is adjusted for each counter electrode line such that the potential distribution of each counter electrode line is brought close to the optimum Vcom, thereby enabling the display characteristic of the liquid crystal display device to be uniformized in the display area.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Configuration

Figure 1A:
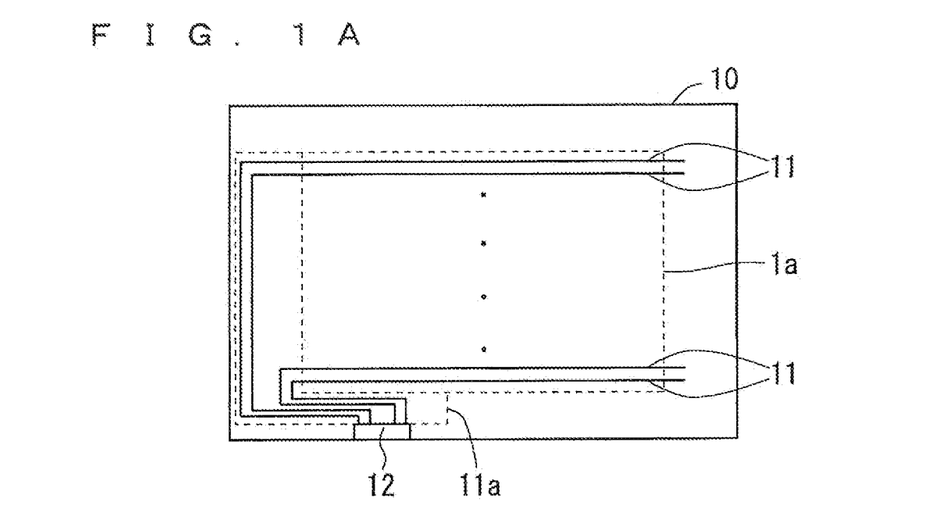
FIGS. 1A and 1B are plan views each showing a configuration of a TFT array substrate of a liquid crystal display device according to a first preferred embodiment.
Figure 1B:
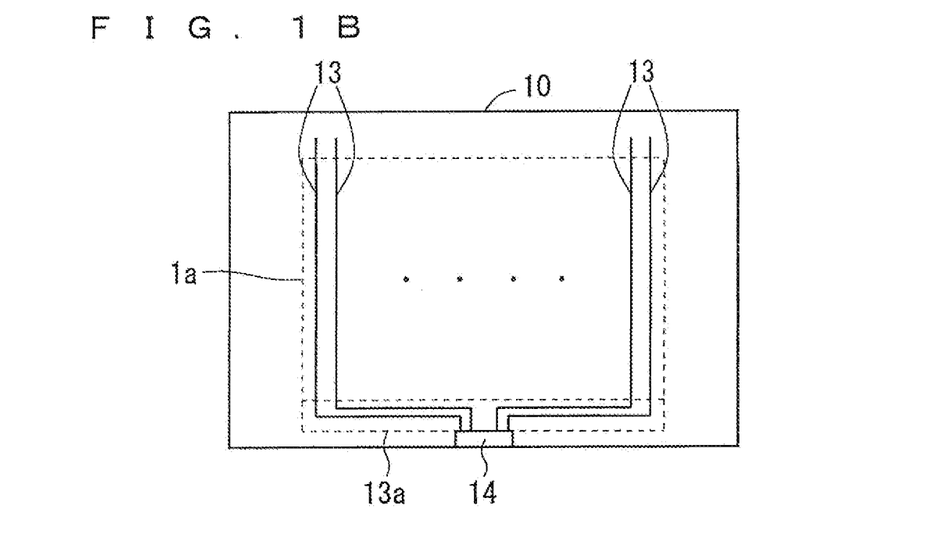

A liquid crystal display device according to this preferred embodiment is a liquid crystal display device in which liquid crystals (not shown) are sealed between a TFT array substrate 10, and a counter substrate 20 formed with a counter electrode. FIG. 1A shows a configuration of scanning signal wirings 11 that are disposed on the TFT array substrate 10 of the liquid crystal display device according to this preferred embodiment. FIG. 1B shows a configuration of image signal wirings 13 that are disposed on the TFT array substrate 10 of the liquid crystal display device according to this preferred embodiment.

As shown in FIG. 1A, in the TFT array substrate 10, a gate IC 12 that controls a scanning signal is mounted on the lower side of the TFT array substrate 10. A plurality of the scanning signal wirings 11 are extended from the gate IC 12 via a routing wiring area 11a in a horizontal direction with respect to a display area 1a.

As shown in FIG. 1B, in the TFT array substrate 10, a source IC 14 that controls an image signal is mounted on the lower side of the substrate. A plurality of the image signal wirings 13 are extended from the source IC 14 via a routing wiring area 13a in a vertical direction with respect to the display area 1a.

In FIG. 1A, in order to secure easy viewing of the drawing, the image signal wirings 13, the routing wiring area 13a of the image signal wirings 13, and the source IC 14 are omitted. Similarly, in FIG. 1B, in order to secure easy viewing of the drawing, the scanning signal wirings 11, the routing wiring area 11a of the scanning signal wirings 11, and the gate IC 12 are omitted. Although not shown in the drawings, pixel electrodes and TFTs are arranged on respective intersections of the scanning signal wirings and the image signal wirings that are disposed in a matrix.

Figure 2A:
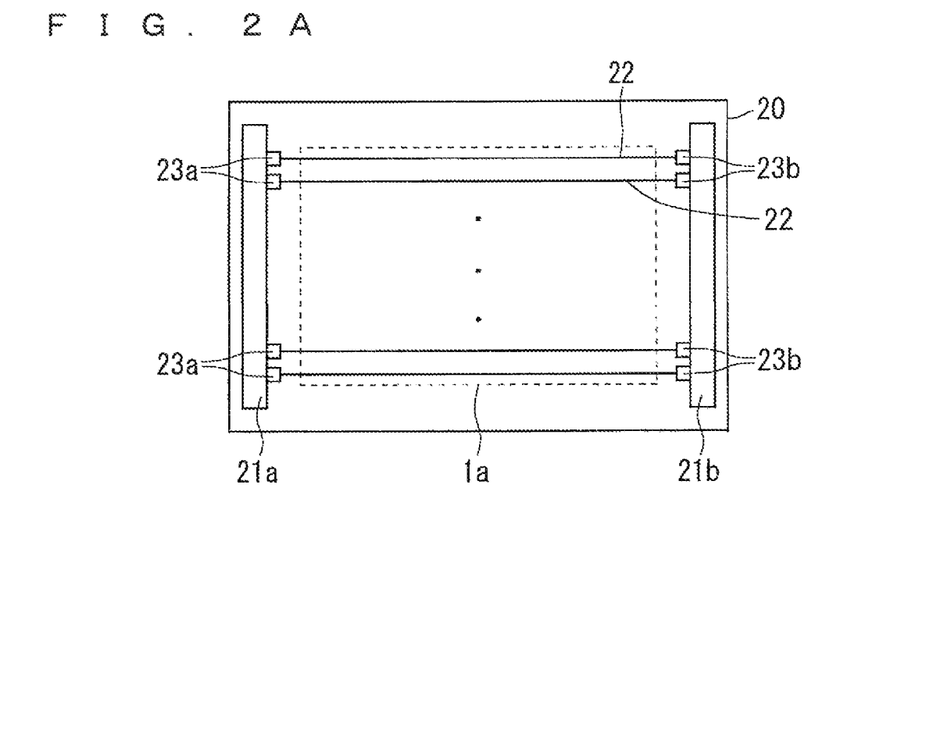
FIGS. 2A and 2B are plan views each showing a configuration of a counter substrate of the liquid crystal display device according to the first preferred embodiment.

FIG. 2A shows a configuration of the counter substrate 20 of the liquid crystal display device according to this preferred embodiment. The counter substrate 20 includes a counter electrode, first and second counter potential input parts 21a and 21b, and color filters (not shown). The counter electrode is configured from a plurality of counter electrode lines 22 that are extended in the horizontal direction with respect to the display area 1a. Each counter electrode line 22 is disposed along the corresponding scanning signal wiring 11 in FIG. 1A. That is, the counter electrode is configured from the counter electrode lines 22, the number of which is the same as the number of the scanning signal wirings 11.

The both ends of the counter electrode lines 22 are connected to the first and second counter potential input parts 21a and 21b, respectively. Each of the counter electrode lines 22 includes resistors 23a and 23b on respective connecting parts with the first counter potential input part 21a and the second counter potential input part 21b. In the display area 1a, the counter electrode lines 22 are formed of ITO (Indium Tin Oxide) with a constant width.

Figure 2B:
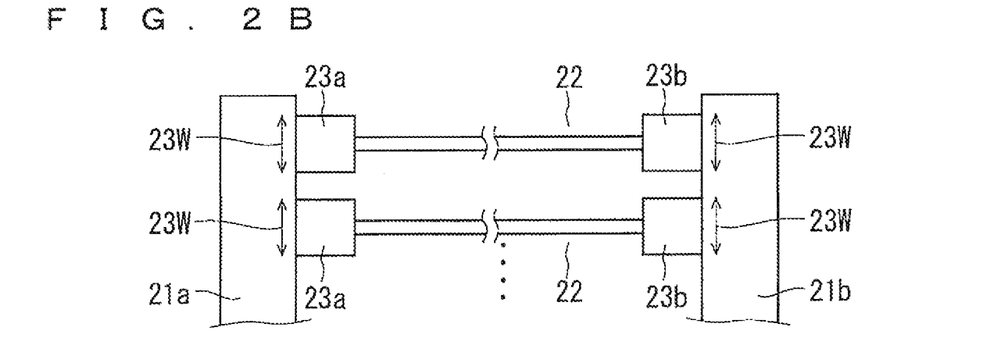

FIG. 2B shows an enlarged view of the connecting parts of the counter electrode lines 22 and the first and second counter potential input parts 21a and 21b. In this preferred embodiment, the resistors 23a and 23b are formed of ITO, and as shown in FIG. 2B, the resistance values of the counter electrode lines 22 can be changed by changing the line widths 23W of the resistors 23a and 23b. When the line widths 23W are made wider, the resistance values become small. On the contrary, when the line widths 23W are made narrower, the resistance values become large.

Operation

Figure 3A:
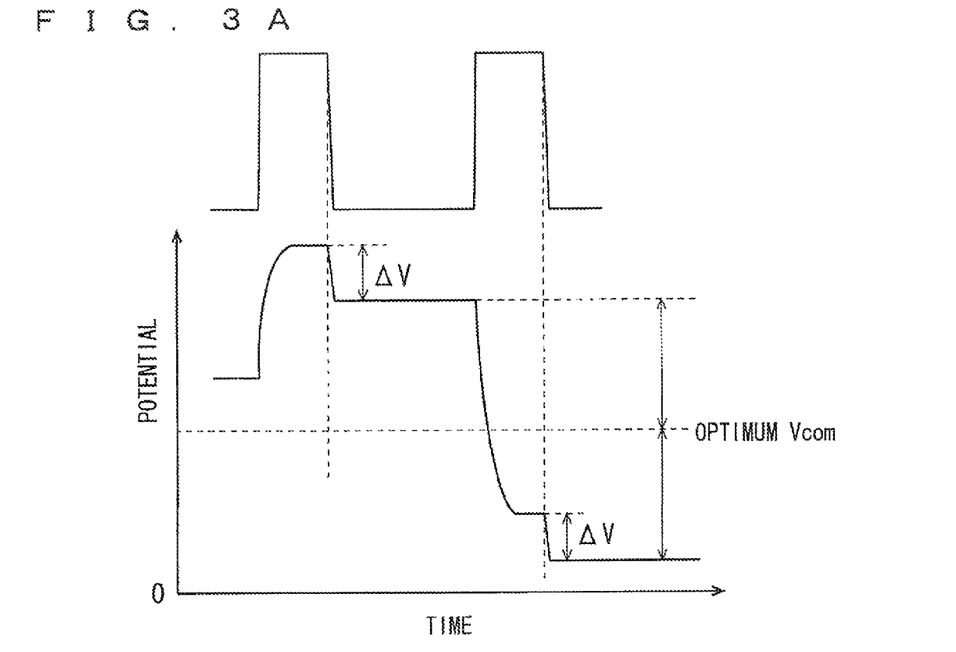
FIGS. 3A and 3B are views each showing potential change of a pixel electrode on the lower side of a display area according to the first preferred embodiment.
Figure 3B:
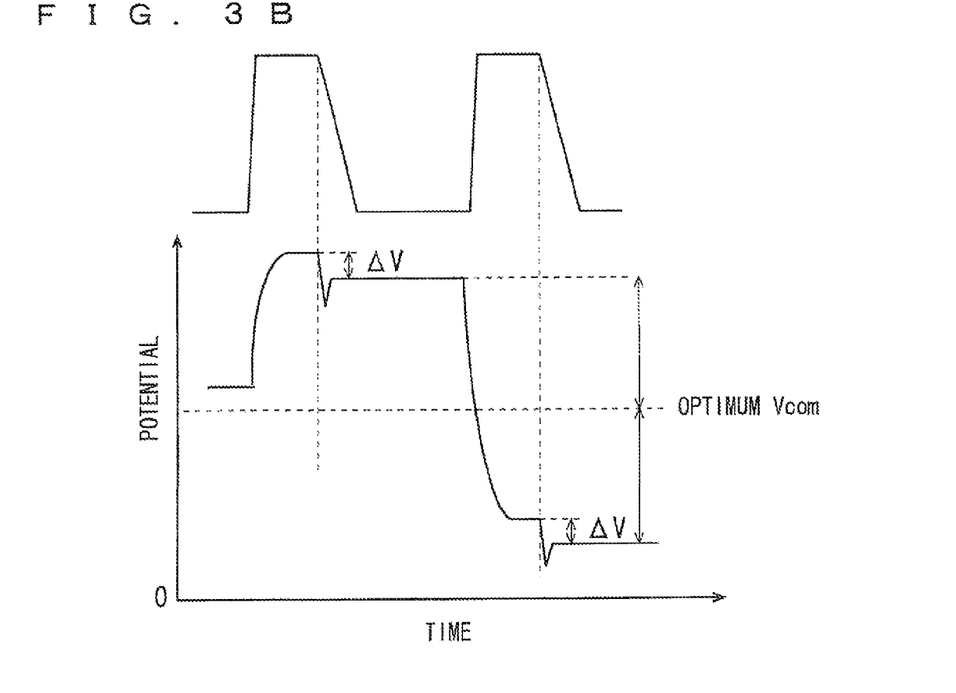

FIGS. 3A and 3B each show a waveform of a scanning signal in the scanning signal wiring 11 whose routing wiring from the gate IC 12 is the shortest (i.e., the scanning signal wiring 11 on the lower side of the display area 1a), and time change of the potential of the pixel electrode connected to this scanning signal wiring 11. FIG. 3A and FIG. 3B represent potential change on the scanning signal input side and potential change on the scanning signal terminal side, respectively.

From FIGS. 3A and 3B, it is found that the delay of the scanning signal on the scanning signal terminal side is larger than the delay of the scanning signal on the scanning signal input side. Additionally, a feedthrough voltage $\Delta V$ in FIG. 2B is smaller than a feedthrough voltage $\Delta V$ in FIG. 3A. This means that the feedthrough voltage decreases with increase in the delay of the scanning signal.

Since the optimum Vcom is determined by the center potential of the potential after feedthrough, when the feedthrough voltage $\Delta V$ decreases, the optimum Vcom increases. That is, the optimum Vcom on the scanning signal terminal side (FIG. 3B) is larger than the optimum Vcom on the scanning signal input side (FIG. 3A). From the above, a distribution of the optimum Vcom on the lower side of the display area 1a is schematically represented by the solid line in FIG. 4.

Figure 5A:
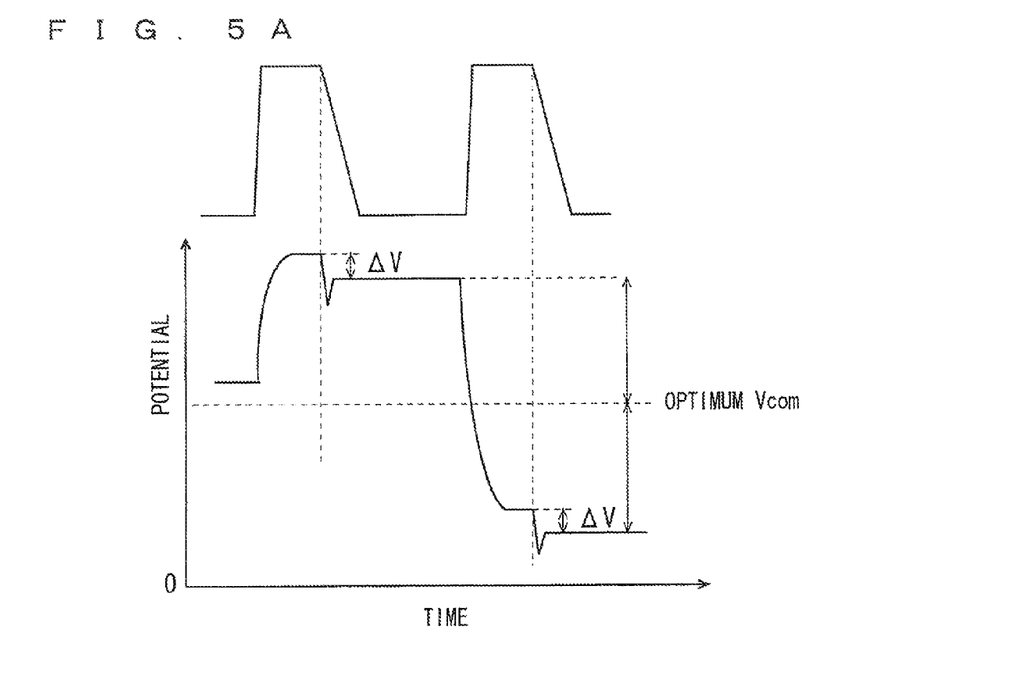
FIGS. 5A and 5B are views each showing potential change of a pixel electrode on the upper side of the display area according to the first preferred embodiment.
Figure 5B:
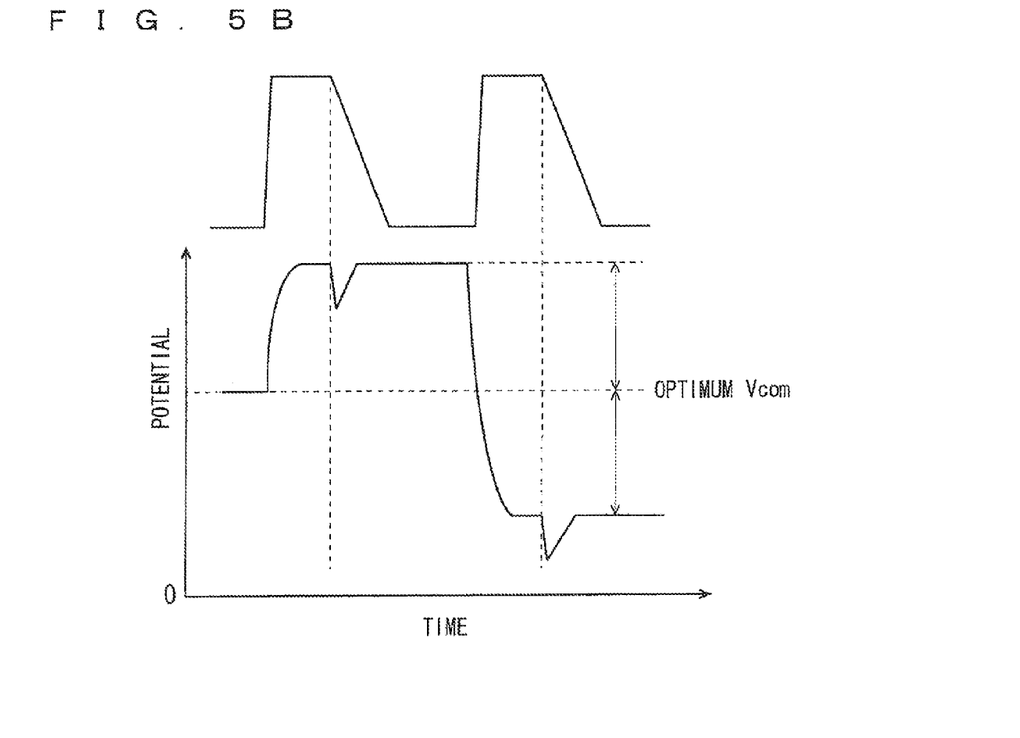

FIGS. 5A and 5B each show the potential of a scanning signal in the scanning signal wiring 11 whose routing wiring from the gate IC 12 is the longest (i.e., the scanning signal wiring 11 on the upper side of the display area 1a), and time change of the potential of the pixel electrode connected to this scanning signal wiring 11. FIG. 5A and FIG. 5B represent potential change on the scanning signal input side and potential change on the scanning signal terminal side, respectively.

Similarly to FIGS. 3A and 3B, from FIGS. 5A and 5B, it is found that the optimum Vcom on the scanning signal terminal side is larger than the optimum Vcom on the scanning signal input side. Additionally, a feedthrough voltage $\Delta V$ in FIG. 5A is smaller than a feedthrough voltage $\Delta V$ in FIG. 3A. That is, even on the same scanning signal input side, the optimum Vcom in the scanning signal wiring whose routing wiring is longer is larger. From the above, a distribution for the optimum Vcom on the upper side of the display area 1a is schematically represented by the broken line in FIG. 4.

In the aforementioned description, the optimum Vcom in the scanning signal wiring 11 whose routing wiring is the shortest, and the optimum Vcom in the scanning signal wiring 11 whose routing wiring is the longest are described. The lengths of the routing wirings of the scanning signal wirings 11 become longer from the lower side of the display area 1a to the upper side, and therefore potential distributions of the optimum Vcom in other scanning signal wirings 11 serially appear from the distribution represented by the solid line in FIG. 4 toward the distribution represented by the broken line between these distributions with the increase in the length of the routing wiring.

Figure 4:
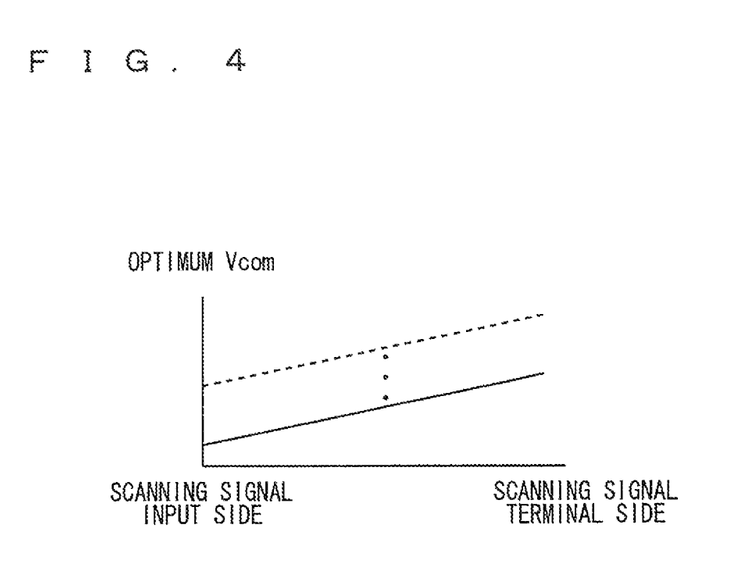
FIG. 4 is a view schematically showing a potential distribution of optimum common potentials of the liquid crystal display device according to the first preferred embodiment.

In this preferred embodiment, with a configuration described below, the potential distribution for the counter electrode (i.e., the potential distribution of each counter electrode line 22) can be brought close to the potential distribution of the optimum Vcom that is schematically shown in FIG. 4.

In this preferred embodiment, different potentials are input to the first and second counter potential input parts 21a and 21b. Consequently, the distribution of the counter potentials is inclined in the direction in which the counter electrode lines 22 extend. In the potential distribution of the optimum Vcom shown in FIG. 4, the potential on the scanning signal terminal side (i.e., second counter potential input part 21b side) is higher, and therefore a potential that is higher than a potential input to the first counter potential input part 21a is input to the second counter potential input part 21b.

Furthermore, in this preferred embodiment, the resistance values of the resistors 23a and 23b that are provided on the both ends of each counter electrode line 22 are adjusted. Consequently, the distribution of the counter potentials can be changed for each counter electrode lines 22.

More specifically, with respect to the counter electrode line 22 corresponding to the scanning signal wiring 11 whose routing wiring is the longest (i.e., the counter electrode line 22 on the upper side of the display area 1a), the resistance value of the resistor 23a is set to be larger than the resistance value of the resistor 23b. As the lengths of the routing wirings become shorter, the resistance values of the resistors 23a become gradually small, and the resistance values of the resistors 23b become gradually large. With respect to the counter electrode line 22 corresponding to the scanning signal wiring 11 whose routing wiring is the shortest (i.e., the counter electrode line 22 on the lower side of the display area 1a), the resistance value of the resistor 23b is set to be larger than the resistance value of the resistor 23a.

As described above, the resistance values of the resistors 23a and 23b are set for each counter electrode line 22, so that the potential distribution for each counter electrode line 22 can be brought close to the potential distribution of the optimum Vcom in FIG. 4.

The counter electrode lines 22 are not formed just above the scanning signal wirings 11, so that parasitic capacitance that the scanning signal wirings 11 have can be decreased. Consequently, it is possible to decrease the driving power consumption of the gate IC 12. Additionally, the delay of the scanning signal can be decreased by the reduction in parasitic capacitance, and therefore it is possible to decrease difference between the respective potentials that are input to the first and second counter potential input parts 21a and 21b. Consequently, it is possible to decrease power consumption.

Modification of First Preferred Embodiment

Figure 6:
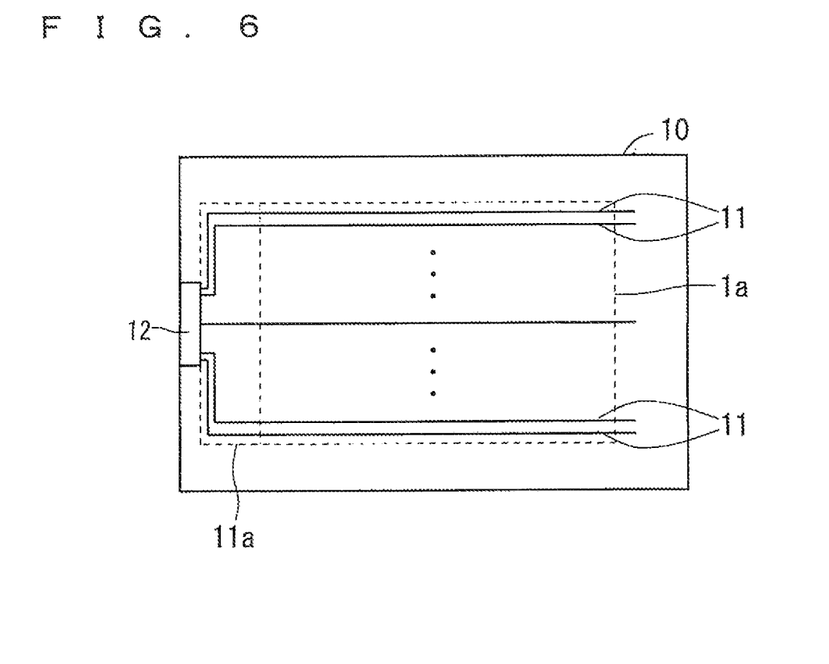
FIG. 6 is a plan view showing a configuration of a TFT array substrate according to a modification of the first preferred embodiment.

A configuration of a TFT array substrate 10 according to this modification is shown in FIG. 6. In this modification, a gate IC 12 is mounted on the left side of a display area 1a. Other configurations are the same as those of the first preferred embodiment, and therefore description thereof will be omitted. In this case, optimum Vcom distributions in the respective ends on the lower and upper sides of the display area 1a, in which routing wirings from the gate IC 12 are the longest, become the same, and are schematically represented by the broken line in FIG. 4. Additionally, an optimum Vcom distribution for pixel electrodes on the center of the display area 1a, in which a routing wiring from the gate IC 12 is the shortest, is schematically represented by the solid line in FIG. 4.

Optimum Vcom distributions corresponding to other scanning signal wirings appear in the order of the length of the routing wiring between the respective distributions represented by the broken line and the solid line in FIG. 4. Even in a case where the gate IC 12 is arranged as in this modification, the resistance values of the resistors 23a and 23b provided on the both ends of each counter electrode line 22 are changed according to the length of the routing wiring, so that the potential distribution in each counter electrode line 22 can be brought close to the optimum Vcom distribution.

Figure 7:
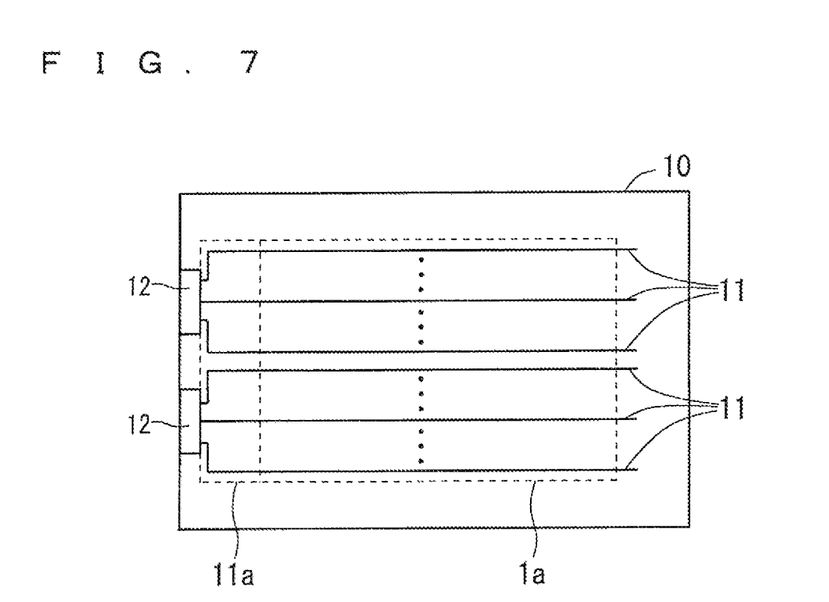
FIG. 7 is a plan view showing a configuration of a TFT array substrate according to another modification of the first preferred embodiment.

A configuration of a TFT array substrate 10 according to another modification is shown in FIG. 7. As shown in FIG. 7, gate ICs 12 may be mounted on two portions of the left side of a display area 1a. Also in this case, the resistance values of resistors 23a and 23b provided on the both ends of each counter electrode line 22 are adjusted according to the lengths of routing wirings from the respective gates IC 12, so that the potential distribution in each counter electrode line 22 can be brought close to the optimum Vcom distribution.

Effects

The liquid crystal display device according to this preferred embodiment is a liquid crystal display device in which liquid crystals are sealed between the TFT array substrate 10, and the counter substrate 20 formed with the counter electrode, the plurality of scanning signal wirings 11 and the plurality of image signal wirings 13 are formed in a matrix on the TFT array substrate 10, the counter electrode is configured from a plurality of the counter electrode lines 22, each of the plurality of counter electrode lines 22 is provided along a corresponding one of the plurality of the scanning signal wirings 11 or a corresponding one of the plurality of image signal wirings 13 in plan view, each of the plurality of counter electrode lines 22 has a potential distribution in an extending direction, and the respective potential distributions for the plurality of counter electrode lines 22 are different.

That is, in this preferred embodiment, the counter electrode lines 22 each have the counter potential distribution in the extending direction, and the respective counter potential distributions for the counter electrode lines 22 are different. Accordingly, even in a case where the optimum common potential (optimum Vcom) has a distribution in vertical and horizontal directions with respect to the display area 1a, the potential distribution is adjusted for each counter electrode line 22 such that the potential distribution in each counter electrode line 22 is brought close to the optimum Vcom, thereby enabling the display characteristic of the liquid crystal display device to be uniformized in the display area 1a.

In the liquid crystal display device according to this preferred embodiment, the TFT array substrate 10 or the counter substrate 20 includes the first and second counter potential input parts 21a and 21b along the both ends of the plurality of counter electrode lines 22 in plan view, the both ends of the plurality of counter electrode lines 22 are connected to the first and second counter potential input parts 21a and 21b, respective different potentials are input to the first and second counter potential input parts 21a and 21b, and resistance values of the plurality of counter electrode lines 22 are different.

Accordingly, the respective different potentials are input to the first and second counter potential input parts 21a and 21b, so that the counter potential distributions in the counter electrode lines 22 can be inclined. Furthermore, the resistance values of the counter electrode lines 22 are made different for the respective counter electrode lines 22, so that the counter potential distribution can be changed for each counter electrode line 22. Accordingly, the potential distribution in each counter electrode line 22 can be adjusted so as to be brought close to the optimum Vcom.

In the liquid crystal display device according to this preferred embodiment, each of the plurality of counter electrode lines 22 includes the resistors 23a and 23b on the respective connecting parts with the first counter potential input part 21a and the second counter potential input part 21b.

Accordingly, the resistance values of the resistors 23a and 23b are changed for each counter electrode line 22 according to the length of the routing wiring of the corresponding scanning signal wiring 11, thereby enabling the resistance value of the each counter electrode line 22 to be changed.

In the liquid crystal display device according to this preferred embodiment, the resistors 23a and 23b are formed of indium tin oxide (ITO), and the line widths 23W of the resistors 23a and 23b vary depending on each of the plurality of counter electrode lines 22.

Accordingly, the resistance values of the resistors 23a and 23b can be changed by changing the line widths 23W of the resistors 23a and 23b, and therefore the resistance values of the counter electrode lines 22 can be changed according to the line widths 23W.

Second Preferred Embodiment

Figure 8:
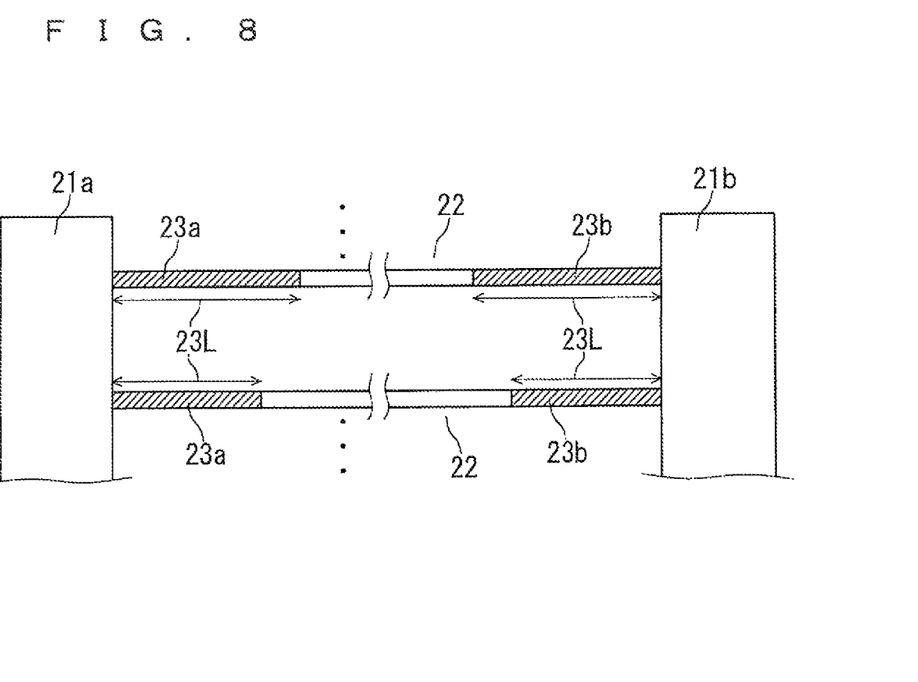
FIG. 8 is a partial plan view showing a configuration of a counter substrate according to a second preferred embodiment.

FIG. 8 is a plan view of connecting parts of first and second counter potential input parts 21a and 21b and counter electrode lines 22 on a counter substrate according to this preferred embodiment. While the resistors 23a and 23b are formed of ITO in the first preferred embodiment, resistors 23a and 23b are formed by metal members in this preferred embodiment. As shown in FIG. 8, the lengths 23L of the metal members are changed with respect to a direction in which the counter electrode lines 22 extend. When the lengths 23L of the metal members are increased, the lengths of ITO parts of the counter electrode lines 22 are relatively decreased, and the resistance values of the counter electrode lines 22 become small. On the contrary, when the lengths 23L of the metal members are decreased, the lengths of the ITO parts of the counter electrode lines 22 are relatively increased, and the resistance values of the counter electrode lines 22 become large.

In this preferred embodiment, the first and second counter potential input parts 21a and 21b are formed of metal, and the resistors 23a and 23b are directly connected to the first and second counter potential input parts 21a and 21b, respectively.

Effects

In the liquid crystal display device according to this preferred embodiment, the first and second counter potential input parts 21a and 21b are metal, and the resistors 23a and 23b are metal members, the lengths of the metal members in the direction in which the counter electrode lines 22 extend vary depending on each of the plurality of counter electrode lines 22.

Accordingly, the resistance value can be changed for each counter electrode line 22 by changing the lengths 23L of the metal members serving as the resistors 23a and 23b that are provided on the both ends of the counter electrode lines 22. Therefore, the potential distribution can be changed for each counter electrode line 22 by adjusting the lengths 23L of the metal members. Thus, it is possible to obtain effects that are similar to those described in the first preferred embodiment.

Third Preferred Embodiment

Figure 9:
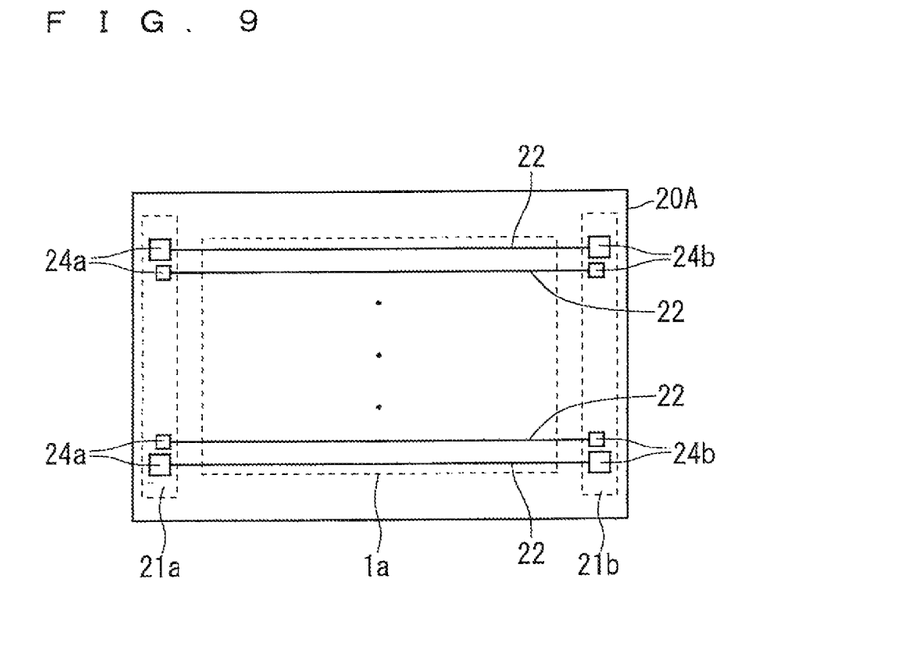
FIG. 9 is a plan view showing a configuration of a counter substrate according to a third preferred embodiment.

FIG. 9 shows a configuration of a counter substrate 20A according to this preferred embodiment. In this preferred embodiment, first and second counter potential input parts 21a and 21b are provided on a TFT array substrate 10, unlike the first and second preferred embodiments.

As shown in FIG. 9, each of counter electrode lines 22 includes metal members 24a and 24b on the both ends of the counter electrode line 22. The metal members 24a and 24b that are disposed on the counter substrate 20A are electrically connected to the first and second counter potential input parts 21a and 21b that are provided on the TFT array substrate 10, respectively, via transfers (not shown) formed by conductive paste (e.g., silver paste). Other configurations are the same as those of the first preferred embodiment, and therefore description thereof will be omitted.

In this preferred embodiment, the areas of the metal members 24a and 24b are changed for each counter electrode line 22. Consequently, the respective contact areas of the metal members 24a and 24b and the first and second counter potential input parts 21a and 21b are changed. When the contact area is large, the resistance value of the counter electrode line 22 becomes small. When the contact area is small, the resistance value becomes large. Therefore, the resistance value is changed for each counter electrode line 22 by changing the areas of the metal members 24a and 24b, so that the potential distribution in each counter electrode line 22 can be brought close to the optimum Vcom.

Effects

In the liquid crystal display device according to this preferred embodiment, the first and second counter potential input parts 21a and 21b are provided on the TFT array substrate 10, each of the plurality of counter electrode lines 22 includes the metal members 24a and 24b on the both ends thereof, and the respective contact areas of the metal members 24a and 24b and the first and second counter potential input parts 21a and 21b are different in the plurality of counter electrode lines 22.

Accordingly, the resistance value can be changed for each counter electrode line 22 by changing the areas of the metal members 24a and 24b that are provided on the both ends of the counter electrode lines 22. Thus, it is possible to obtain effects that are similar to those described in the first preferred embodiment.

Fourth Preferred Embodiment

Figure 10:
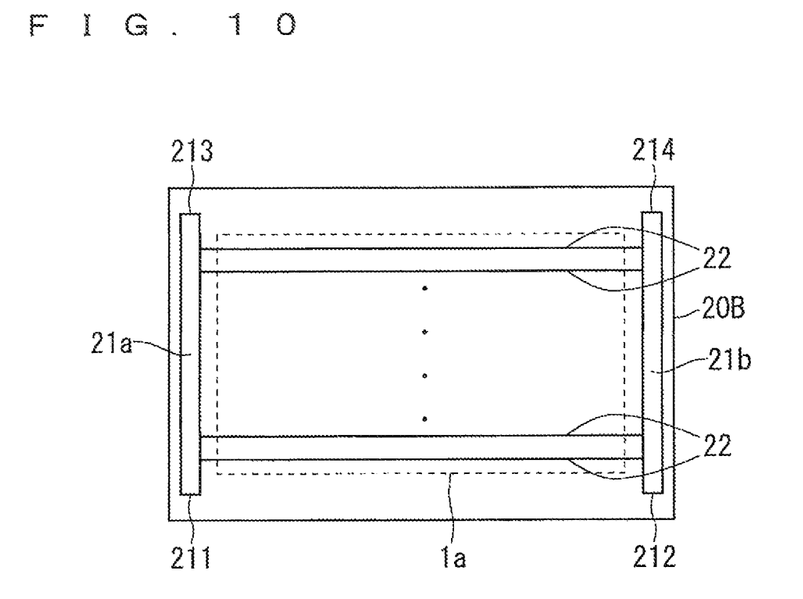
FIG. 10 is a plan view showing a configuration of a counter substrate according to a fourth preferred embodiment.

FIG. 10 is a plan view of a counter substrate 20B according to this preferred embodiment. On the counter substrate 20B, each of a plurality of counter electrode lines 22 is disposed along a corresponding one of a plurality of the scanning signal wirings 11 in plan view. First and second counter potential input parts 21a and 21b are connected to the both ends of the counter electrode lines 22. Configurations other than this are the same as those of the first preferred embodiment, and therefore description thereof will be omitted.

In this preferred embodiment, different voltages are input to the respective both ends (i.e., ends 211, 212, 213 and 214) of the first and second counter potential input parts 21a and 21b.

As shown in FIG. 1A, in a case where a gate IC 12 is mounted on the lower side of a display area 1a, a potential input to the end 211 is made lower than a potential input to the end 213. Additionally, a potential input to the end 212 is made lower than a potential input to the end 214. Consequently, a counter potential distribution can be inclined as shown in FIG. 4.

Furthermore, the potential input to the end 211 is made lower than the potential input to the end 212, and the potential input to the end 213 is made lower than the potential input to the end 214. Consequently, a relative relation between the potential distributions in the counter electrode lines 22 can be brought close to the potential distribution of the optimum Vcom shown in FIG. 4.

In this preferred embodiment, each counter electrode line 22 may include resistors 23a and 23b on the both ends thereof, similarly to the first preferred embodiment. The resistance values of the counter electrode lines 22 can be changed by changing the resistance values of the resistors 23a and 23b, and the potential distribution of each counter electrode line 22 can be accurately adjusted.

Effects

In the liquid crystal display device according to this preferred embodiment, the TFT array substrate 10 or the counter substrate 20 includes the first and second counter potential input parts 21a and 21b along the both ends of the plurality of counter electrode lines 22 in plan view, and the both ends of the plurality of counter electrode lines 22 are connected to the first and second counter potential input parts 21a and 21b, different potentials are input to the respective both ends of the first and second counter potential input parts 21a and 21b.

Accordingly, the different potentials are input to the respective both ends of the first and second counter potential input parts 21a and 21b, thereby enabling the potential distributions to be inclined in the extending direction and the adjacent direction of the counter electrode lines 22. Therefore, the potential distribution in each counter electrode line 22 can be adjusted such that the potential distribution in each counter electrode line 22 is brought close to the optimum Vcom.

Additionally, in the liquid crystal display device according to this preferred embodiment, the respective resistance values of the plurality of counter electrode lines 22 are different. Accordingly, it is possible to accurately adjust the potential distribution in each counter electrode line 22.

Fifth Preferred Embodiment

Figure 11:
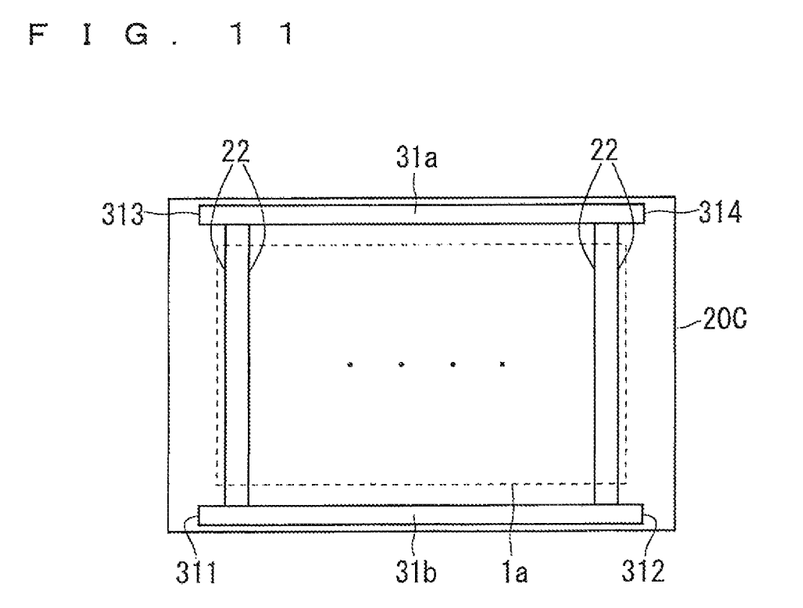
FIG. 11 is a plan view showing a configuration of a counter substrate according to a fifth preferred embodiment.

FIG. 11 is a plan view of a counter substrate 20C according to this preferred embodiment. In the fourth preferred embodiment (FIG. 10), each of the plurality of counter electrode lines 22 is disposed along a corresponding one of the plurality of the scanning signal wirings 11. On the other hand, in this preferred embodiment, as shown in FIG. 11, each of a plurality of counter electrode lines 22 is disposed along a corresponding one of a plurality of image signal wirings 13. In this preferred embodiment, first and second counter potential input parts 31a and 31b are arranged along the upper and lower sides of a display area 1a, in place of the first and second counter potential input parts 21a and 21b that are arranged on the right and left sides of the display area 1a. The both ends of each counter electrode line 22 are connected to the first and second counter potential input parts 31a and 31b. Configurations other than this are the same as those of the first preferred embodiment, and therefore description thereof will be omitted.

In this preferred embodiment, different voltages are input to the respective both ends (i.e., ends 311, 312, 313 and 314) of the first and second counter potential input parts 31a and 31b.

In a case where a gate IC 12 is mounted at a position shown in FIG. 1A, a potential input to the end 311 is made lower than a potential input to the end 312. Additionally, a potential input to the end 313 is made lower than a potential input to the end 314. Consequently, a counter potential distribution can be inclined as shown in FIG. 4.

Furthermore, the potential input to the end 311 is made lower than the potential input to the end 312, and the potential input to the end 313 is made lower than the potential input to the end 314. Consequently, a relative relation between the potential distributions in the counter electrode lines 22 can be brought close to the potential distribution of the optimum Vcom shown in FIG. 4.

In this preferred embodiment, each counter electrode line 22 may include resistors 23a and 23b on the both ends thereof, similarly to the first preferred embodiment. The resistance values of the counter electrode lines 22 can be made different by changing the resistance values of the resistors 23a and 23b. Therefore, it is possible to more accurately adjust the potential distribution in each counter electrode line 22.

The counter electrode lines 22 are not formed just above the image signal wirings 13, so that parasitic capacitance that the image signal wirings 13 have can be decreased. Consequently, it is possible to decrease the driving power consumption of a source IC 14. Additionally, it is possible to suppress the calorific value of the source IC. Moreover, the delay of a pixel signal due to impedance of the source IC is decreased, and therefore it is possible to secure a longer charging time.

Sixth Preferred Embodiment

Figure 12A:
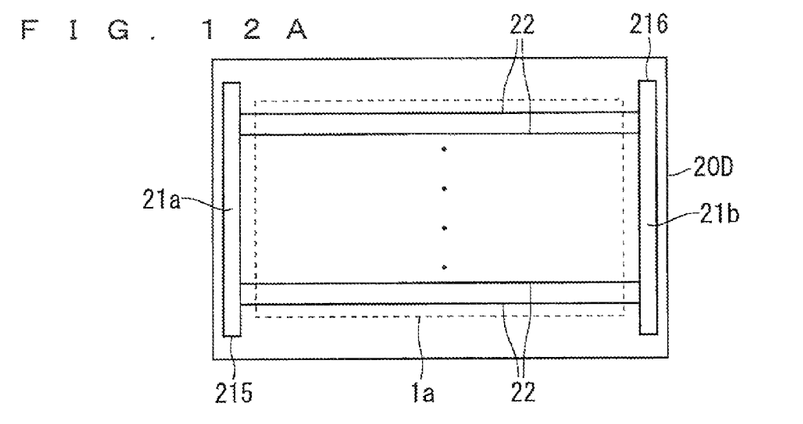
FIGS. 12A, 12B and 12C are plan views each showing a configuration of a counter substrate according to a sixth preferred embodiment.

FIG. 12A shows a configuration of a counter substrate 20D according to this preferred embodiment. The counter substrate 20D according to this preferred embodiment has a configuration in which the counter substrate 20 of the first preferred embodiment (FIGS. 2A and 2B) does not includes the resistors 23a and 23b. In this preferred embodiment, first and second counter potential input parts 21a and 21b are formed of ITO.

A case where a gate IC 12 is mounted at a position shown in FIG. 1A will be considered. In this case, as described in the first preferred embodiment with reference to FIG. 4, the optimum Vcom on the second counter potential input part 21b side (i.e., terminal side) is higher. Additionally, the optimum Vcom on the lower side of a display area 1a is higher than the optimum Vcom on the upper side. Therefore, a potential V1 is input to the first counter potential input part 21a from a lower end 215, and a potential V2 higher than the potential V1 is input to the second counter potential input part 21b from an upper end 216.

The first and second counter potential input parts 21a and 21b are formed of ITO, and the first and second counter potential input parts 21a and 21b themselves act as resistors, and therefore the potential that is input from the lower end 215 of the first counter potential input part 21a becomes lower toward the upper end. Additionally, the potential that is input from the upper end 216 of the second counter potential input part 21b becomes lower toward the lower end. Accordingly, the potential of the each counter electrode line 22 becomes larger from the first counter potential input part 21a side toward the second counter potential input part 21b. Additionally, the potential of each counter electrode line 22 becomes larger from the lower side of the display area 1a toward the upper side. That is, the potential distribution for each electrode line 22 can be brought close to the optimum Vcom distribution shown in FIG. 4.

Figure 12B:
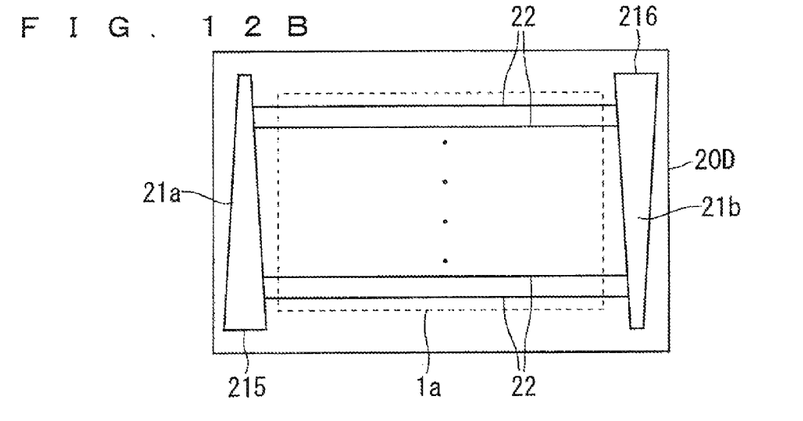
Figure 12C:
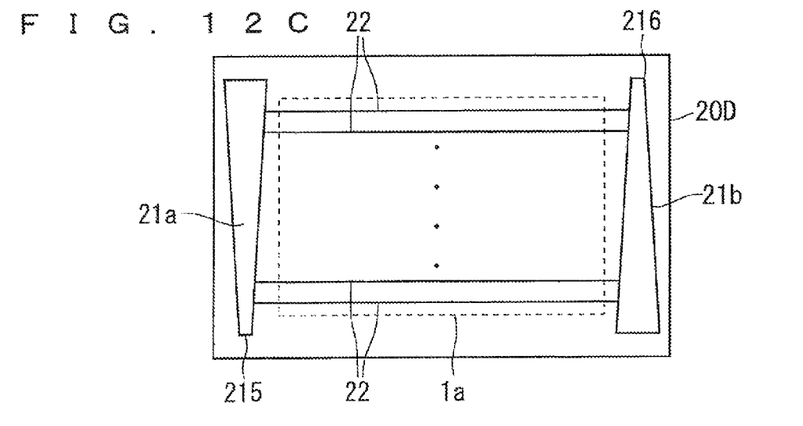

As shown in FIGS. 12B and 12C, the widths of the first and second counter potential input parts 21a and 21b may be changed in the extending directions of the first and second counter potential input parts 21a and 21b. For example, in FIG. 12B, the widths of the first and second counter potential input parts 21a and 21b are each narrower from an end on the side on which the potential is input, toward other end. With such a configuration, the narrower the width becomes, the larger the resistance value per unit length becomes, and therefore it is possible to further increase the difference between the potentials of the both ends of each of the first and second counter potential input parts 21a and 21b.

On the other hand, in FIG. 12C, the widths of the first and second counter potential input parts 21a and 21b each become wider from an end on the side on which the potential is input, toward other end. With such a configuration, the wider the width becomes, the smaller the resistance value per unit length becomes, and therefore it is possible to further decrease the difference between the potentials of the both ends of each of the first and second counter potential input parts 21a and 21b.

Thus, the first and second counter potential input parts 21a and 21b are formed of ITO, and furthermore the widths of the first and second counter potential input parts 21a and 21b are changed, so that the potential distribution for each electrode line 22 can be more finely adjusted.

Effects

In the liquid crystal display device according to this preferred embodiment, the TFT array substrate 10 or the counter substrate 20 includes the first and second counter potential input parts 21a and 21b along the both ends of a plurality of the counter electrode lines 22 in plan view, the both ends of the plurality of counter electrode lines 22 are connected to the first and second counter potential input parts 21a and 21b, respective different potentials are input to the first and second counter potential input parts 21a and 21b, and the first and second counter potential input parts 21a and 21b are formed of indium tin oxide (ITO).

Accordingly, the first and second counter potential input parts 21a and 21b are formed of ITO, in place of the configuration in which the resistors 23a and 23b are provided on the both ends of the counter electrode lines 22 as in the first preferred embodiment, so that the first and second counter potential input parts 21a and 21b themselves act as resistors. Therefore, it is possible to obtain effects that are similar to those described in the first preferred embodiment.

In the liquid crystal display device according to this preferred embodiment, the widths of the first counter potential input part 21a and the second counter potential input part 21b are changed with respect to the direction in which the first and second counter potential input parts 21a and 21b extend.

Accordingly, the first and second counter potential input parts 21a and 21b are formed of ITO, and furthermore the widths of the first and second counter potential input parts 21a and 21b are changed, so that the change in the resistance values of the first and second counter potential input parts 21a and 21b can be changed. Therefore, the potential distribution in each counter electrode line 22 can be brought close to the optimum Vcom distribution.

Seventh Preferred Embodiment

In each of the first to sixth preferred embodiments, the line widths of counter electrode lines 22 in the display area 1a are made constant. That is, the resistance values of the counter electrode lines 22 in the display area 1a are constant. In this preferred embodiment, the shapes of the counter electrode lines 22 in the display area 1a are changed on lines. Configurations other than this are the same as those of the first to sixth preferred embodiments, and therefore description thereof will be omitted.

Figure 13:
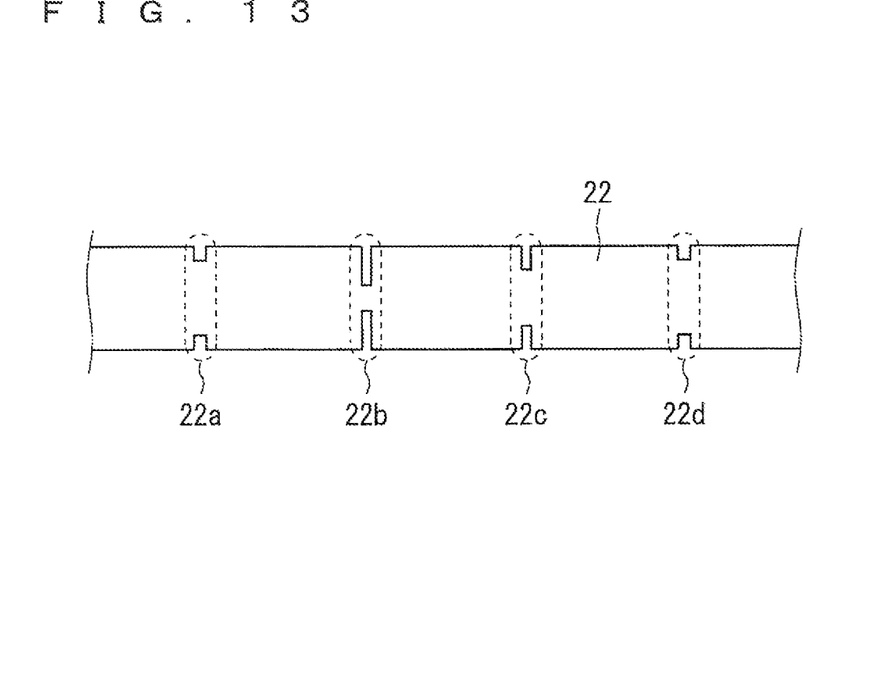
FIG. 13 is a view showing a configuration of a counter electrode line according to a seventh preferred embodiment.

FIG. 13 is a partial plan view of the counter electrode line 22. Slit parts 22a, 22b, 22c and 22d are provided with slits, thereby making the line width of each counter electrode line 22 narrower. Additionally, the degrees of the narrowness are different in the respective areas. Thus, the distributions of resistance values can be provided on the counter electrode lines 22 by changing the line widths of the counter electrode lines 22 on the lines.

Figure 14:
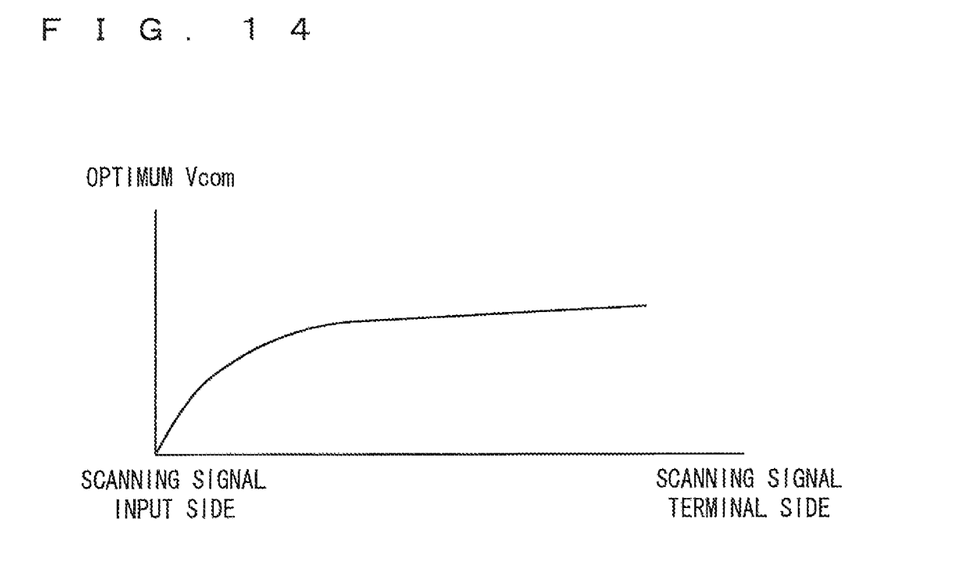
FIG. 14 is a view schematically showing a potential distribution of optimum common potentials of the liquid crystal display device according to the seventh preferred embodiment.

The potential distribution in each counter electrode line 22 can be brought close to a potential distribution of the optimum Vcom by changing the shape (e.g., line width) of the counter electrode line 22 in the display area 1a, even in a case where the distribution of the optimum Vcom depicts a saturation curve and has a gentle slope on a scanning signal wiring terminal part as shown in FIG. 14. In a case where signal delay is particularly large, the potential distribution of the optimum Vcom becomes a distribution similar to that in FIG. 14.

In FIG. 13, the slit parts 22a, 22b, 22c and 22d are provided so as to overlap the black matrix of color filters in plan view, so that the influence of the change of the line widths on the visibility of a display image can be suppressed.

Effects

In the liquid crystal display device according to this preferred embodiment, the shapes of the counter electrode lines 22 are changed in the extending directions.

Accordingly, on the counter electrode lines 22, for example, the line widths are changed by providing slit parts, so that the distributions of resistance values are provided on the counter electrode lines 22. Therefore, even in a case where the distribution of the optimum Vcom depicts a curve, the distribution of the counter potentials can be brought close to the distribution of the optimum Vcom by changing the positions of the slit parts and the depths of the slits.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display device comprising:
   a TFT array substrate; and
   a counter substrate formed with a counter electrode, wherein
   liquid crystals are sealed between said TFT array substrate and said counter substrate formed with said counter electrode,
   a plurality of scanning signal wirings and a plurality of image signal wirings are formed in a matrix on said TFT array substrate,
   said counter electrode is configured from a plurality of counter electrode lines,
   each of said plurality of counter electrode lines is provided along a corresponding one of said plurality of scanning signal wirings, or a corresponding one of said plurality of image signal wirings in plan view,
   each of said plurality of counter electrode lines has a potential distribution in an extending direction, and
   said respective potential distributions for said plurality of counter electrode lines are different.

2. The liquid crystal display device according to claim 1, wherein
   said TFT array substrate or said counter substrate includes first and second counter potential input parts along both ends of said plurality of counter electrode lines in plan view,
   the both ends of said plurality of counter electrode lines are connected to said first and second counter potential input parts, respectively, and
   respective different potentials are input to both ends of each of said first and second counter potential input parts.

3. The liquid crystal display device according to claim 2, wherein
   respective resistance values of said plurality of counter electrode lines are different.

4. The liquid crystal display device according to claim 3, wherein
   each of said plurality of counter electrode lines includes resistors on respective connecting parts with said first counter potential input part and said second counter potential input part.

5. The liquid crystal display device according to claim 4, wherein
   said resistors are formed of indium tin oxide, and
   line widths of said resistors vary depending on each of said plurality of counter electrode lines.

6. The liquid crystal display device according to claim 3, wherein
   said first and second counter potential input parts are provided on said TFT array substrate,
   each of said plurality of counter electrode lines includes metal members on the both ends thereof, and
   respective contact areas of said metal members and said first and second counter potential input parts are different in said plurality of counter electrode lines.

7. The liquid crystal display device according to claim 4, wherein
   said first and second counter potential input parts are metal,
   said resistors are metal members,
   lengths of said metal members in a direction in which said counter electrode lines extend vary depending on each of said plurality of counter electrode lines.

8. The liquid crystal display device according to claim 1, wherein
   said TFT array substrate or said counter substrate includes first and second counter potential input parts along both ends of said plurality of counter electrode lines in plan view,
   the both ends of said plurality of counter electrode lines are connected to said first and second counter potential input parts, respectively,
   respective different potentials are input to the first and second counter potential input parts and
   respective resistance values of said plurality of counter electrode lines are different.

9. The liquid crystal display device according to claim 8, wherein
   each of said plurality of counter electrode lines includes resistors on respective connecting parts with said first counter potential input part and said second counter potential input part.

10. The liquid crystal display device according to claim 9, wherein
    said resistors are formed of indium tin oxide, and
    line widths of said resistors vary depending on each of said plurality of counter electrode lines.

11. The liquid crystal display device according to claim 8, wherein
    said first and second counter potential input parts are provided on said TFT array substrate,
    each of said plurality of counter electrode lines includes metal members on the both ends thereof, and
    respective contact areas of said metal members and said first and second counter potential input parts are different in said plurality of counter electrode lines.

12. The liquid crystal display device according to claim 9, wherein
    said first and second counter potential input parts are metal,
    said resistors are metal members,
    lengths of said metal members in a direction in which said counter electrode lines extend vary depending on each of said plurality of counter electrode lines.

13. The liquid crystal display device according to claim 1, wherein
    said TFT array substrate or said counter substrate includes first and second counter potential input parts along both ends of said plurality of counter electrode lines in plan view,
    the both ends of said plurality of counter electrode lines are connected to said first and second counter potential input parts,
    respective different potentials are input to said first and second counter potential input parts, and
    said first and second counter potential input parts are formed of indium tin oxide.

14. The liquid crystal display device according to claim 13, wherein
    said first counter potential input part and said second counter potential input part have distributions of resistance values with respect to a direction in which said first and second counter potential input parts extend.

15. The liquid crystal display device according to claim 1, wherein
shapes of said counter electrode lines are changed in the extending direction.

* * * * *